June 26, 1951     S. CLAVÉ ET AL     2,558,236
OPTICAL IMAGE ERECTING SYSTEM AND MOUNTING THEREFOR
Filed Feb. 21, 1949
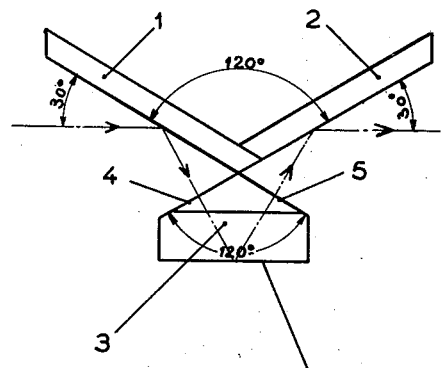
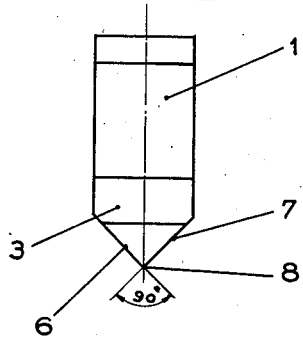
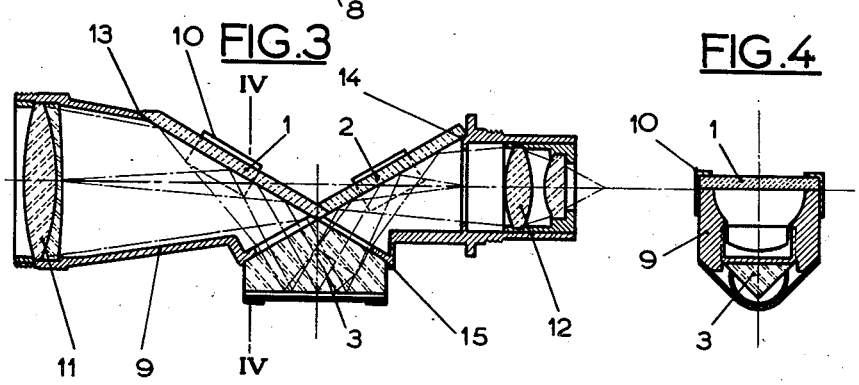
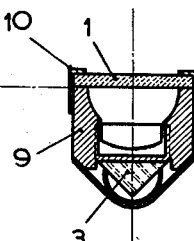
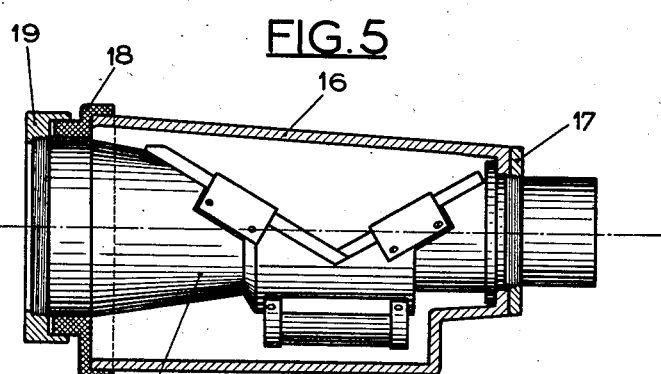
INVENTORS:
SERGE CLAVÉ and
MARCEL CLAVÉ
By Wenderoth, Lind & Ponack
ATTORNEYS Patented June 26, 1951

2,558,236

UNITED STATES PATENT OFFICE 2,558,236

OPTICAL IMAGE ERECTING SYSTEM AND MOUNTING THEREFOR

Serge Clavé and Marcel Clavé, Paris, France

Application February 21, 1949, Serial No. 77,606
In France February 25, 1948

1 Claim. (Cl. 88—33)

This invention relates to image erecting arrangements for optical instruments, particularly but not exclusively binoculars and field-glasses.

A number of optical instruments, particularly those for long-distance observation such as field-glasses, comprise an image erecting arrangement. In the known constructions, such arrangements only include prisms, which may be associated in different manners.

A principal disadvantage of prisms is due to the fact that they absorb a great amount of the received light rays, either by reflection, absorption or diffusion. This disadvantage is detrimental to the quality of the observed image received by the objective.

On the other hand, the shapes and arrangements of prisms involve heavy and bulky mountings, the size of which is considerable as compared with the size of the objective and ocular or eye-piece, and the weight of which amounts to a great proportion of the total weight of the complete instrument.

For the purpose of decreasing the weight, particularly for portable optical instruments, mountings have been made of very light alloys including magnesium, which is an expensive metal further requiring care in machining. Mounts made of plastic materials have been proposed also in a view of lightness; said mounts, however, have the disadvantages of requiring special molds, complicating the fixation of the prisms and giving an insecure and unreliable setting of the optical members since the plastic parts supporting said optical members are subjected to deformation when the temperature conditions and moisture content of air are changing.

Attempts have been made also to reduce the total weight of a portable optical instrument by decreasing the diameter of the objective. This simultaneously reduces the optical qualities of the instrument, particularly its image brightness and definition.

An object of the present invention is to avoid the drawbacks encountered in previous construction.

Another object is to provide an improved image erecting arrangement for optical instruments.

A further object of this invention is to provide an improved image erecting arrangement which offers high optical qualities.

Yet another object of this invention is to provide an improved image erecting arrangement which is light in weight, strong and simple.

A further object of this invention is to provide an improved mounting for an image erecting arrangement which is light and dependable.

The above-mentioned and further objects of the present invention will be apparent from the following detailed description of a preferred embodiment thereof, made by way of illustration only and not intended to restrict the scope of the invention in any way, in connection with the annexed drawings, wherein:

Fig. 1 is a diagrammatic cross-section of an image erecting arrangement according to the invention;

Fig. 2 is a front view of Fig. 1.

Fig. 3 is a longitudinal cross-sectional view of the mount of a field-glass equipped with an objective, an eye-piece and an image erecting arrangement according to the invention.

Fig. 4 is a cross-sectional view taken along line IV—IV of Fig. 3; and

Fig. 5 illustrates in partial sectional view the arrangement of Figs. 3 and 4 as equipped in the body of a field-glass.

Referring now to the drawings, the image erecting arrangement of this invention, manufactured according to any well-known method, comprises a pair of plane metallized mirrors 1, 2 associated with a "roof-shaped" prism 3, obtained from any convenient transparent material. Both mirrors are angularly positioned with an angle of 30° with respect to the main optical axis of the instrument and are positioned at 120° with respect to each other. The roof-shaped prism 3 is arranged under these mirrors 1, 2 in such a way that the common lower edge of the under faces of the prism is parallel with the optical axis of the optical instrument and that the entrance face 4 and exit face 5 of said prism 3 are parallel respectively with the operating faces of the opposite mirrors 2 and 1.

On the other hand, the roof-shaped prism 3 is so arranged that the reflected light beam from the first mirror 1 completely enters said prism.

The light beam from the instrument objective, therefore, firstly strikes the first plane mirror 1, is then reflected by said mirror, thus enters the prism 3 through the upper entrance face 4 thereof, is then subjected to two successive reflections on the under faces 6 and 7 of the prism 3, which are cut at right angles with respect to each other and which intersect along a prism edge 8 parallel with the instrument optical axis. The light beam then emerges through the upper exit face 5 of the prism 3 and is once more reflected by the second plane mirror 2 to be directed to the eye-piece of the instrument.

Preferably, the assembly comprising the mirrors 1 and 2 and the roof-shaped prism 3 has such a position in the mounting that the prism edge 8 substantially extends in the vicinity of the point where the light cone formed by the beam has its smaller diameter. As a result, the size of the prism 3 may be very small, and thus the prism 3 may be light in weight and cause little light diffusion.

The new image erecting arrangement according to the invention further enables the optical axes of the objective and of the ocular to be kept in line, thereby reducing the total dimensions of the optical instrument to their minimum value.

Another advantage of the new image erecting arrangement of the invention may be found in the general mounting of the optical members. The mirrors 1, 2 and the roof-shaped prism 3 indeed may be secured to a metal mount 9 of tubular shape by means of lugs 10, as illustrated in Figs. 3 and 4; the metal mount 9 may support at one end thereof an objective 11 and an eye-piece 12 at its other end. The mirrors 1 and 2 are supported on two plane bearings 13, 14 formed from the tubular mount 9 at 120° with respect to each other. Symmetrically arranged with respect to said bearings 13, 14 an opening 15 is provided in the tubular mounting 9 for receiving the prism 3 which rests on a pair of supports also angularly displaced by 120° from each other.

Due to this arrangement, the objective and eye-piece may be mounted and set before the tubular mounting 9 which supports all optical parts is well secured in the housing 16 of a field-glass, for instance by means of an inner threaded ring 17 as illustrated in Fig. 5, or by any other well-known arrangement.

Means are provided whereby the other end of the mount is freely displaceable in a seating formed in the instrument body, in order that said body may be distorted under the action of temperature conditions or shocks or any other effect, without affecting the optical setting of the elements. For this purpose, a second ring 18 threadedly secured to the housing 16, may freely slide in an axial direction on the set front end of the tubular mount 9, while another inner threaded ring 19, screwed on the front end of the tubular mount 9, partially overlaps the ring 18, thereby preventing harm from dust and the like.

Due to the fact that the mount 9 is independent of the instrument housing 16, said housing may be made of plastic material so that changes in temperature or moisture content of the atmosphere, will not cause distortion of the plastic to produce a harmful result in optically upsetting the image erecting and lens assembly.

While the present invention has been described in conjunction with a preferred embodiment thereof, it is to be clearly understood that such description has been made for the sake of illustration only, and that therefore numerous changes and variations may be made to the described embodiment without departing from the scope and spirit of the invention as defined in the appended claim.

What we claim is:

An optical system including an image erecting arrangement, comprising in combination a tubular mounting formed with two diametrically opposed first and second pairs of supporting surfaces, said surfaces of each pair being angularly displaced at 120° with respect to each other, one surface of each pair being parallel to one surface of the other pair, a pair of mirrors at 120° to each other resting on the first pair of surfaces, a reflection prism having two upper faces displaced by 120° from each other, fitting on the second pair of surfaces and two under faces perpendicular to each other, the line of intersection of said under faces being parallel to said tubular mounting axis, an objective secured at one end of said tubular mounting, and an ocular mounted at the other end thereof, a housing enclosing the reflecting elements, said housing secured at the rear end of the tubular mounting by a light tight rear annular ring, a cylindrical surface formed in said tubular mounting at the front end thereof, a first shouldered ring having an inner and outer surface, the inner surface fitting and slidingly engaging one end of said cylindrical surface, said ring having a laterally projecting annular portion secured to said housing and a second shouldered ring threadedly secured to said tubular mounting at the front end thereof with a laterally projecting annulus fitting and overlapping said outer surface of said first ring to provide a shock proof light tight suspension of the optical elements in the instrument.

SERGE CLAVÉ.
MARCEL CLAVÉ.

REFERENCES CITED

The following references are of record in the file of this patent:

UNITED STATES PATENTS

| Number | Name | Date |
|---|---|---|
| 986,642 | Moller | Mar. 14, 1911 |
| 1,016,606 | Berger | Feb. 6, 1912 |
| 1,687,030 | Mitchell | Oct. 9, 1928 |
| 2,406,213 | Gallasch | Aug. 20, 1946 |
| 2,406,798 | Burroughs | Sept. 3, 1946 |
| 2,410,757 | Street | Nov. 5, 1946 |